(12) United States Patent
Li et al.

(10) Patent No.: US 11,472,588 B2
(45) Date of Patent: Oct. 18, 2022

(54) WIDTH-ADJUSTABLE PACKAGING BAG SHAPER, BAG MAKER, PACKAGING MACHINE AND METHOD

(71) Applicants: QINGDAO UNIVERSITY OF TECHNOLOGY, Shandong (CN); NINGBO SANHAN ALLOY MATERIAL CO., LTD., Zhejiang (CN)

(72) Inventors: Changhe Li, Qingdao (CN); Baoteng Huang, Qingdao (CN); Liang Luo, Qingdao (CN); Xianzhi Liu, Qingdao (CN); Yanbin Zhang, Qingdao (CN); Dongzhou Jia, Qingdao (CN); Min Yang, Qingdao (CN); Yali Hou, Qingdao (CN); Zhaorong Bing, Qingdao (CN)

(73) Assignees: QINGDAO UNIVERSITY OF TECHNOLOGY, Qingdao (CN); NINGBO SANHAN ALLOY MATERIAL CO., LTD., Ningbo (CN)

( * ) Notice: Subject to any disclaimer, the term of this patent is extended or adjusted under 35 U.S.C. 154(b) by 180 days.

(21) Appl. No.: 16/961,611

(22) PCT Filed: Oct. 29, 2019

(86) PCT No.: PCT/CN2019/114100
§ 371 (c)(1),
(2) Date: Jul. 10, 2020

(87) PCT Pub. No.: WO2021/081775
PCT Pub. Date: May 6, 2021

(65) Prior Publication Data
US 2021/0403191 A1     Dec. 30, 2021

(30) Foreign Application Priority Data
Nov. 1, 2018   (CN) .......................... 201811296165.2

(51) Int. Cl.
*B65B 43/04* (2006.01)
*B65B 41/16* (2006.01)
(Continued)

(52) U.S. Cl.
CPC .............. *B65B 43/04* (2013.01); *B65B 41/16* (2013.01); *B65B 59/005* (2013.01); *B65B 19/34* (2013.01)

(58) Field of Classification Search
CPC ......... B65B 41/16; B65B 43/04; B65B 59/00; B65B 59/003; B65B 59/005; B65B 59/02; B65B 19/34
See application file for complete search history.

(56) References Cited

U.S. PATENT DOCUMENTS 3,338,023 A * 8/1967 Lazenby ................. B65B 35/24
                                                    53/553
4,506,488 A * 3/1985 Matt ....................... B65B 57/00
                                                    53/550

(Continued)

FOREIGN PATENT DOCUMENTS

CN         202462984 U      10/2012
CN         105857668 A      8/2016
(Continued)

OTHER PUBLICATIONS

Jan. 23, 2020 Search Report issued in International Patent Application No. PCT/CN2019/114100.
(Continued)

*Primary Examiner* — Andrew M Tecco
(74) *Attorney, Agent, or Firm* — Oliff PLC

(57) ABSTRACT

A width-adjustable packaging bag shaper, a bag maker, a packaging machine, and a method. The packaging machine including the bag maker, a traction device and a heat sealing device are respectively arranged above the bag maker, and
(Continued)

a width adjustment device adjusts the distances between different sub bottom plates in a front bottom plate and a rear bottom plate by using a leadscrew and slide block mechanism, and then adjusts the width of a bottom plate. The leadscrew and slide block mechanism is used as the width adjustment device of the automatic width-adjustable noodle packaging bag shaper system, and four bottom plates are respectively fixed to the width adjustment device, so the leadscrew and slide block mechanism in operation is accurate in range of adjustment, is suitable for various widths of packaging bags, and has very important significance for the three-dimensional shaping effect of the packaging bags.

13 Claims, 9 Drawing Sheets

(51) Int. Cl.
*B65B 59/00* (2006.01)
*B65B 19/34* (2006.01)

(56) References Cited

U.S. PATENT DOCUMENTS

| | | | | |
|---|---|---|---|---|
| 4,574,566 A | * | 3/1986 | Eaves | B65B 9/067 53/550 |
| 4,722,168 A | * | 2/1988 | Heaney | B65B 9/067 53/550 |
| 4,761,937 A | * | 8/1988 | Francioni | B65B 9/06 53/550 |
| 4,947,623 A | * | 8/1990 | Saito | B65B 57/10 53/550 |
| 5,138,815 A | * | 8/1992 | Groschen, Jr. | B65B 9/067 53/550 |
| 5,524,420 A | * | 6/1996 | Ikuta | B65B 57/12 53/550 |
| 5,564,261 A | * | 10/1996 | Kiner | B65B 9/067 53/529 |
| 5,566,526 A | * | 10/1996 | Suga | B65B 9/067 53/550 |

FOREIGN PATENT DOCUMENTS

| | | | | |
|---|---|---|---|---|
| CN | 205418269 U | | 8/2016 | |
| CN | 206841760 U | | 1/2018 | |
| CN | 108275321 A | * | 7/2018 | B65B 43/08 |
| CN | 108275321 A | | 7/2018 | |
| CN | 109353596 A | | 2/2019 | |
| CN | 209305935 U | | 8/2019 | |
| WO | 2015/190370 A1 | | 12/2015 | |

OTHER PUBLICATIONS

Jan. 23, 2020 Written Opinion of the International Searching Authority issued in International Patent Application No. PCT/CN2019/114100.

* cited by examiner

B—B

WIDTH-ADJUSTABLE PACKAGING BAG SHAPER, BAG MAKER, PACKAGING MACHINE AND METHOD

FIELD OF THE INVENTION

The present disclosure relates to the technical field of machining, in particular to a width-adjustable packaging bag shaper, a bag maker, a packaging machine, a control system and method.

BACKGROUND OF THE INVENTION

In recent years, the increase in the production of noodles and the development of automation have promoted the development of the noodle packaging industry, but there are still many aspects that need to be improved during the development of packaging machines, wherein the bag makers cannot adjust the widths of packaging bags according to the weights of noodles, which reduces the production efficiency of the packaging machines and increases the production costs.

An automatic width-adjustable noodle packaging bag shaper system is composed of a shaper, a bottom plate, a width adjustment device, a side plate, a 51 single-chip microcomputer, a stepper motor, a power supply, etc., wherein the important parts in a bag maker comprise the shaper, a leadscrew and slide block mechanism, and a control system. The structure of the shaper has a direct impact on the form, size and appearance of a packaging bag.

Judging from the research results of domestic and foreign researchers on shapers for many years, the shapers on the market are now relatively mature, the research is also more in-depth, and the package shapers on the market are generally in the shape of drums and fill materials while packaging plastic paper. This form of packaging is a relatively advanced automatic packaging production line on the market at present. The common bag maker shaper includes a lapel shaper, a trunk-like shaper, a triangle shaper, a U-shaped shaper, etc. These shapers have different shapes and single functions, and correspond to different forms of packaging.

The above several shapers are introduced below, and a novel shaper is designed according to the characteristics of these shapers.

Lapel shaper: when a plastic bag passing through a delivery wheel passes through the surface of the lapel shaper, the plastic bag shrinks and bends inward along the curved surface of the shaper, then the plastic bag is pulled by a traction device for plastic packaging in front of the shaper to shrink into a gap in the middle of the lapel shaper, and the plastic bag is thermally glued and sealed by a heat sealing wheel. This shaper has great resistance to the shaping of plastic bags, and the packaging bags are prone to deformation and wrinkle, which affects the appearance of the packaging bags. This shaper has poor adaptability to packaging films, but has better adaptability to composite films, and it is often used in vertical pillow type bag-making packaging machines and is suitable for powdery and granular materials. Moreover, the bag maker is complicated in design, difficult to manufacture and inconvenient for mass production. Furthermore, when problems occur in the operation of the shaper, the complexity of its structure increases the difficulty of maintenance and debug.

Triangle shaper: it is composed of an isosceles acute-angled triangle plate and parallel guide rails connected to a base plate together. During the operation, when a packaging film passing through a delivery wheel passes through the surface of the triangle shaper, the packaging film shrinks on two sides of the isosceles triangle, then the plastic bag is pulled into the parallel guide rails by a traction device for plastic packaging in front of the shaper, and the plastic bag is thermally glued and sealed by a heat sealing wheel. Compared with other shapers, the triangle shaper has the simplest structure and is easy to manufacture.

Trunk-like shaper: This shaper is like a trunk of elephant, and consists of a bent plate, a bottom plate and two fixing plates. The tilting angle of the shaping surface in the front of the shaper is smaller than that of the lapel shaper, and the packaging film moves smoothly, so when the packaging film passes through the shaper, the shaping resistance is small. This shaper is suitable for a vertical continuous three-side sealing bag-making packaging machine. However, this shaper has an obvious shortcoming.

Compared with the lapel shaper, when a packaging bag of the same size is manufactured, the structure size of the trunk-like shaper is larger than that of the lapel shaper. When the structure size is large, the packaging film is more easily deformed in the process of shaping to affect the appearance. This shaper has the same shortcoming as the lapel shaper, and can only form bags of the same width.

U-shaped shaper: this shaper is similar to the triangle shaper and the lapel shaper in structure. The packaging film is less stressed than the lapel shaper in the process of bending, but there is still resistance, causing deformation and wrinkle of the film. It has the advantages of the triangle shaper and a wide range of applications, but its structure is slightly more complicated than that of the triangle shaper.

Right-angled notch guide plate shaper: this shaper is composed of a notched guide plate, a guide roller and a bilateral heat sealing roller. The structure is simple, the parts thereof are easy to manufacture, but the debugging is relatively complicated. When operating, it can split the flat film and then automatically fold and seal the film into a cylindrical shape. It can pack powdery and granular materials, and is often used in a vertical continuous combined packaging machine.

Although the shapers have been continuously developed with the development of the packaging machines, they have not solved some problems that have troubled the industry for many years, and have the following main problems:

(1) Not only one weight of noodles is packed on the market, so different specifications of packaging bags are required, but the existing shapers can only manufacture a single size of packaging bags. In order to adapt to different packaging specifications, the size of the shaper needs to be changed, a new shaper needs to be designed and remounted, and the debug is also relatively complicated.

(2) The research on the shaper in the industry still stays in traditional geometric modeling, and is not deep enough in the stress on material shaping and the machining of the shaper.

(3) The design method of the traditional shaper is based on the study of geometric theory, with abstract mathematical models and many parameters, so it is difficult to understand and cannot be widely used in design.

(4) The existing shapers are mostly manufactured by bending steel plates, and some enterprises adopt the methods of casting and the like. Each manufacturing method has advantages and disadvantages, but all have a common drawback that they cannot guarantee accurate deformation of materials during shaping.

SUMMARY OF THE INVENTION

In order to solve the shortcomings of the prior art, one aspect of the present disclosure is to provide a width-adjustable packaging bag shaper in which the width of a bag maker can be adjusted more conveniently to adapt to the packaging of noodles of various weights.

In order to achieve the above purpose, the present application adopts the following technical solution:

A width-adjustable packaging bag shaper comprises two parts arranged symmetrically, and the width between the two parts is adjustable, the middle part serves as a guide surface, two sides of the guide surface are side wings bent toward the middle part, and the parts where the lengths of the side wings exceed the guide surface are bent toward the back of the guide surface to form back tilting angles; and the shaper can realize that when a packaging film passes, the packaging film begins to fold reversely inward by a certain angle.

Another aspect of the present disclosure is to provide a bag maker, which adopts the following technical solution:

A bag maker comprises the width-adjustable packaging bag shaper and further comprises a bag maker triangle plate, the bag maker triangle plate is spatially located obliquely above the shaper, and when a packaging film folded reversely inward by a certain angle passes through the bag maker triangle plate, two sides of the packaging film begin to move closer to the middle to form an approximately square packaging film.

In a further technical solution, one end of the guide surface of the shaper is connected to a bottom plate, the bottom plate comprises a front bottom plate and a rear bottom plate, and the front bottom plate and the rear bottom plate are respectively composed of two sub bottom plates with the same structure;

The front bottom plate and the rear bottom plate are respectively connected to a width adjustment device, and the width adjustment device adjusts the distances between the different sub bottom plates in the front bottom plate and the rear bottom plate by using a leadscrew and slide block mechanism, and then adjusts the width of the bottom plate.

In a further technical solution, the width adjustment device comprises a stepper motor, a leadscrew is connected to an output shaft of the stepper motor by a coupling, the stepper motor drives the leadscrew to rotate simultaneously, the leadscrew is provided with a slide block, a bottom plate fixing block is fixed to the top of the slide block and is movable with the slide block, the bottom plate fixing block is arranged on the bottom plate, the left and right parts of the leadscrew rotate in different directions, and the slide block rotates in the same direction or in the opposite direction when the leadscrew rotates.

In a further technical solution, the motor is fixed to a first guide rail by a motor fixing block, the leadscrew is supported by a bearing embedded into the first guide rail, and a second guide rail is fixed to the first guide rail.

In a further technical solution, the bag maker further comprises side plates, the side plates are arranged above the bottom plate, the widths of the side plates are greater than the maximum width adjustable by the bottom plate, the side plates are fixed to a bag maker support frame by side plate support frames, and two ends of the bag maker support frame are respectively connected to the first guide rail and the second guide rail by fixed shafts.

In a further technical solution, the bottom plate is supported by a bottom plate support frame, and the side plate support frames are fixed to the bag maker support frame.

In a further technical solution, the bag maker triangle plate is fixed to a triangle plate support frame, and the triangle plate support frame is fixed to the first guide rail of the width adjustment device.

Another aspect of the present application is to provide a packaging machine, which adopts the following technical solution:

A packaging machine comprises a bag maker, a traction device and a heat sealing device are respectively arranged above the bag maker, the traction device comprises a traction motor, the traction motor is connected to a first traction gear by a coupling, the first traction gear meshes with a second traction gear, and the first traction gear and the second traction gear are respectively connected to traction wheels by respective traction drive shafts;

The power of the traction motor is transmitted to a traction drive shaft by the coupling, the first traction drive gear is driven to rotate, the second traction drive gear is then driven to rotate, the two traction wheels are driven to rotate by the respective traction drive shafts, and a packaging film moves forward by the squeezing and the friction of the two traction wheels, thus completing the traction process of the packaging film;

The heat sealing device implements heat sealing of the packaging film pulled.

In a further technical solution, the heat sealing device comprises a driving rotating part and a driven rotating part;

The driving rotating part comprises a heat sealing motor, the heat sealing motor transmits the power to a heat sealing shaft, the heat sealing shaft transmits the power to a heat sealing drive gear, a heat sealing drive gear transmits the power to the heat sealing drive shaft, the heat sealing shaft drives the heat sealing wheel to rotate, the drive gear also drives the driven rotating part to rotate, and the heat sealing wheel of the driving rotating part and the heat sealing wheel of the driven rotating part rotate simultaneously by the same power transmission, to drive the packaging film to move and thermally seal the packaging film at the same time.

In a further technical solution, the heat sealing device further comprises an angle adjustment gear, the angle adjustment gear is fixed to a heat sealing fixing seat, and the angle adjustment gear is configured to adjust the relative positions of the two heat sealing wheels to achieve optimal positions of heat sealing.

In a further technical solution, the packaging machine further comprises a control system configured to control the heat sealing motor, the traction motor and the stepper motor.

Another aspect of the present application is to provide a control method for a packaging machine, which adopts the following technical solution:

A control method for the packaging machine, comprising that:

The traction device drives a packaging film to move; when the packaging film passes through the shaper, the packaging film begins to fold reversely inward by a certain angle; when passing through the bag maker triangle plate, two sides of the packaging film begin to move closer to the middle to form an approximately square packaging film, thus completing preliminary shaping;

Driven by the traction device and the heat sealing device, the packaging film arrives at the heat sealing wheel, and under the action of the heat sealing device, the two sides of the packaging film are heated and sealed, thus completing heat sealing of the packaging film;

When the weight of noodles changes, it needs to change the width of a plastic packaging bag; when the widths of the shaper and the front bottom plate of the bag maker need to be adjusted, the width adjustment device begins to operate; when the width adjustment device operates, the stepper motor rotates firstly, the coupling connects the output shaft of the stepper motor to one end of the leadscrew, the rotation of the motor drives the rotation of the leadscrew, and the distance of movement of the slide block can be obtained by determining the number of turns of the motor;

The left and right parts of the leadscrew rotate in different directions; when the leadscrew rotates clockwise or counterclockwise, the slide block is driven to move in the same direction or in the opposite direction; because the slide block is connected to the bottom plate of the bag maker by a bottom plate fixing block, the shaper and the front bottom plate of the bag maker will also move in the same direction or in the opposite direction;

The packaging film moves forward by the squeezing and the friction of the two traction wheels of the traction device, thus completing traction of the packaging film; The heat sealing device drives the packaging film to move and thermally seals the packaging film at the same time.

Compared with the prior art, the beneficial effects of the present disclosure are:

The shaper of the automatic width-adjustable noodle packaging bag shaper system according to the present disclosure optimizes traditional several types of shapers, in which a triangle plate is added to guide the transportation of the plastic packaging film. With the shaper, the effect of shaping a plastic packaging film can be achieved, which avoids the use of complex geometric operations to design the shaper.

The machining of the shaper is simpler than the traditional machining, and the width of the shaper can be adjusted according to the width of the packaging film. The shaping surface of the shaper is smoother, unlike the sharp shaping surface of the trunk-like shaper or the right-angled notch guide shaper, so that the indentation of the packaging film is reduced, and the appearance of the packaging bag is more attractive.

The width adjustment of the bag maker is another problem in the design, and the width adjustment is required more. A leadscrew and slide block mechanism is used in the present disclosure as the width adjustment device of the automatic width-adjustable noodle packaging bag shaper system, and the four bottom plates are respectively fixed to the width adjustment device, so the leadscrew and slide block mechanism in operation is accurate in range of adjustment, is suitable for various widths of packaging bags, and has very important significance for the three-dimensional shaping effect of the packaging bags.

At the same time, the leadscrew and slide block mechanism operates very stably, is simple in structure, low in cost and more convenient in manipulation, and does not cause vibration, deviation, etc. during operation.

The rotation of the leadscrew is controlled by the single-chip microcomputer and the stepper motor, which improves the degree of automation of the automatic width-adjustable noodle packaging bag shaper system, so that the width adjustment device can adjust the width more accurately and quickly. Through these innovative designs, the problem that the bag maker cannot adjust the width according to the weight of noodles is solved, the production efficiency of the packaging machine is increased, and the indentation of packaging bags is reduced.

BRIEF DESCRIPTION OF THE DRAWINGS

The accompanying drawings constituting a part of the present application are intended to provide a further understanding of the present application, and the illustrative embodiments of the present application and the descriptions thereof are intended to interpret the present application and do not constitute improper limitations to the present application.

Figure 1:
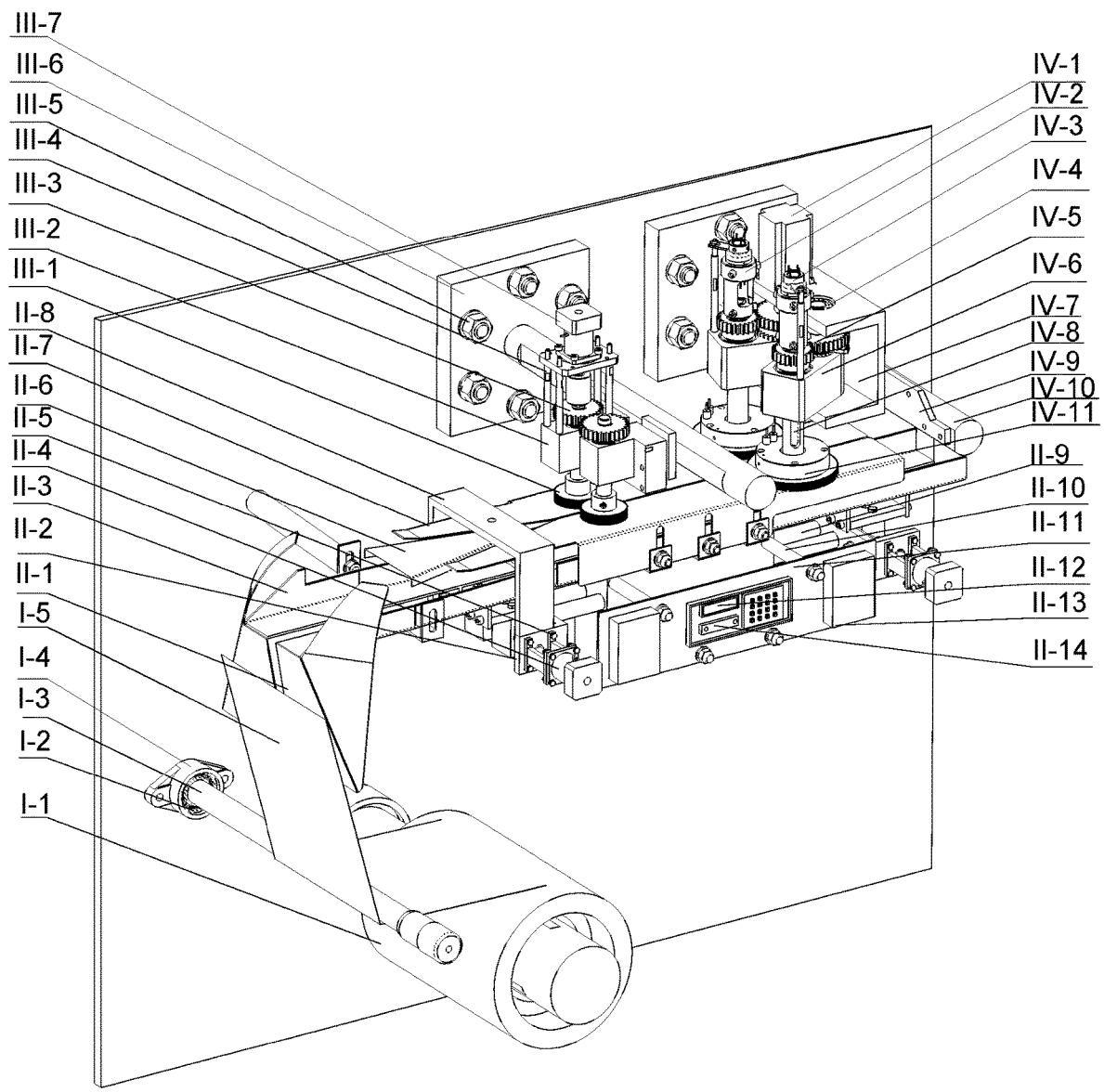
FIG. 1 is a diagram of a packaging machine system according to some embodiments of the present application.

In the figures: I-1 packaging film rotating wheel, I-2 bearing, I-3 packaging film guide roller, I-4 guide roller fixing seat, I-5 packaging film.

II-1 shaper, II-2 first guide rail, II-3 bottom plate, II-4 stepper motor, II-5 motor fixing plate bolt, II-6 triangle plate, II-7 side plate, II-8 triangle plate support frame, II-9 fixed shaft, II-10 control panel support shaft, II-11 control panel, II-12 display screen, II-13 power supply, II-14 single-chip microcomputer, II-15 leadscrew, II-16 second guide rail, II-17 bottom plate fixing block, II-18 bottom plate fixing block bolt, II-19 slide block, II-20 motor fixing block, II-21 coupling, II-22 side plate support frame, II-23 bag maker support frame, II-24 keyboard, II-25 stepper motor fixing bolt, II-26 stepper motor fixing gasket, II-27 stepper motor fixing nut, II-28 motor fixing plate nut, II-29 motor fixing plate gasket, II-30 bottom plate fixing plate screw, II-31 bottom plate fixing plate gasket, II-32 guide rail screw, II-33 side plate support frame bolt, II-34 side plate support frame nut 1, II-35 side plate support frame gasket, II-36 side plate support frame gasket, II-37 bottom plate support frame, II-38 side plate support frame screw, II-39 control panel support shaft gasket, II-40 control panel support shaft nut.

III-1 traction wheel, III-2 traction fixing block, III-3 traction gear, III-4 fixing rod, III-5 traction system fixing seat nut, III-6 traction system fixing seat, III-7 traction motor, III-8 coupling, III-9 traction bearing, III-10 traction drive shaft.

IV-1 heat sealing motor, IV-2 heat insulation sleeve, IV-3 mercury slip ring, IV-4 bearing, IV-5 heat sealing drive gear, IV-6 heat seal fixing block, IV-7 heat seal fixing seat, IV-8 heat sealing shaft, IV-9 heat sealing fixing plate, IV-10 heat seal fixing shaft, IV-11 heat sealing wheel, IV-12 slip ring positioning plate, IV-13 fixing rod nut, IV-14 set screw, IV-15 heat insulation sleeve fixing nut, IV-16 heat insulation sleeve fixing gasket, IV-17 heat insulation sleeve fixing bolt, IV-18 circlip, IV-19 heat sealing drive gear, IV-20 bearing, IV-21 heat sealing inside hexagonal bolt, IV-22 shaft end screw, IV-23 shaft sleeve, IV-24 angle adjustment gear, IV-25 heating plate, IV-26 angle adjustment gear screw, IV-27 heat sealing drive shaft.

DETAILED DESCRIPTION OF THE EMBODIMENTS

It should be noted that the following detailed descriptions are exemplary and are intended to provide further descriptions of the present application. All technical and scientific terms used herein have the same meaning as commonly understood by those of ordinary skill in the technical filed to which the present application belongs, unless otherwise indicated.

It should be noted that the terms used here are merely used for describing specific embodiments, but are not intended to limit the exemplary embodiments of the present invention. As used herein, the singular form is also intended to comprise the plural form unless otherwise indicated in the context. In addition, it should be understood that when the terms "include" and/or "comprise" are used in the description, they are intended to indicate the presence of features, steps, operations, devices, components and/or combinations thereof.

A width adjustment device is a key part for whether an automatic width-adjustable noodle packaging bag shaper system can adjust the width of a packaging bag according to the weight of noodles. The width adjustment device needs to meet the following design requirements:

(1) The size of a bag maker is constant, the designed width adjustment size should not be too large, the width is about 25 cm, the length is 80 cm, and if the length is too long, it is not easy to mount and debug the bag maker.

(2) The difference of widths of noodle packaging bags are little, and the width adjustment range of the packaging bags is only a few centimeters, so the width that needs to be adjusted by the width adjustment device must be very accurate. If the adjustment is not accurate enough, the debug process will be difficult, and the production efficiency will be reduced.

(3) The space of the bag maker in a packaging machine is relatively compact, and the width adjustment device should be designed relatively simple to reduce the difficulty of operation.

(4) The width adjustment device needs to consider the cost. Although the bag maker is an important part of the packaging machine, the packaging machine is already mounted with more electrical devices, so the increase in the cost of the packaging machine is not appropriate, and the cost should be as low as possible to occupy a position in the market.

In a typical embodiment of the present application, as shown in FIG. 3, a width-adjustable packaging bag shaper is provided, which shapes a plastic packaging film by means of cooperation between a novel square lapel shaper and a triangle plate.

The square lapel shaper can produce packaging bags with square cross sections during production. Because the square lapel shaper is designed with a relatively accurate size, it is more difficult to produce and debug the square lapel shaper. In addition, such a shaper cannot solve the problem of width adjustment of the bag maker. In order to reduce the difficulty in manufacturing the lapel shaper, the design of the square lapel shaper is optimized: the existing shaper is divided into two parts from the middle to facilitate the adjustment of width. Because the original structure is changed after the shaper is divided into two parts, two sides of the packaging film cannot be sealed under the traction of a traction device. To solve this problem, the two sides of the packaging film are guided to approach the middle by a triangle plate, and then sealed by a heat sealing wheel. After such improvement, the structure size of the shaper does not need to be very accurate. The back tilting angle of the guide surface of the shaper can be folded by a technician based on experience, and the width of the guide surface is not as complicated as the derivation calculation, which greatly reduces the difficulties in producing and debugging the shaper. Most importantly, this structure is more convenient to adjust the width of the bag maker and adapts to the packaging of various noodle weights. This design method changes the traditional integrated structure of the shaper and the bottom plate, so that the noodle packaging film changes less drastically from the shaper to the bottom plate, and the indentation of a noodle packaging bag can be reduced.

Figure 3A:
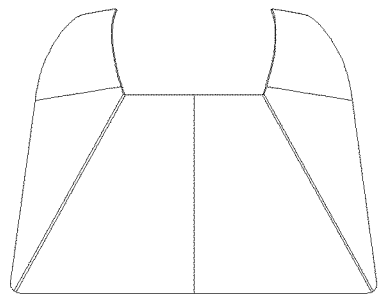
FIG. 3($a$) and FIG. 3($b$) are a front view and an expanded view of a shaper according to some embodiments of the present application.
Figure 3B:
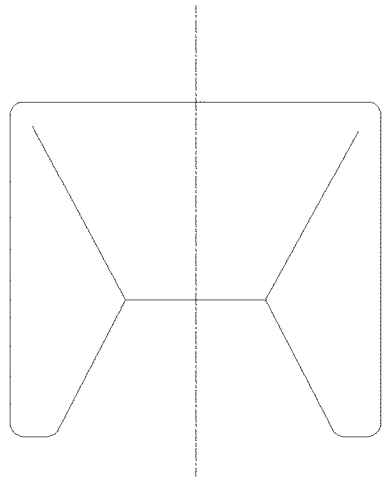

FIG. 3(a) and FIG. 3(b) show a front view and an expanded view of the shaper. The shaper is formed by bending a steel plate and cutting the steel plate from the middle after the bending, or by bending two steel plates respectively. When one steel plate is selected for bending, the steel plate is first folded back to form side wings, the tops of the side wings are bent to form gentle curved surfaces, and then one steel plate is cut into left and right shapers from the middle. The back tilting angle of a guide surface is an angle formed between a side wing of the shaper folded back and the guide surface.

Figure 2:
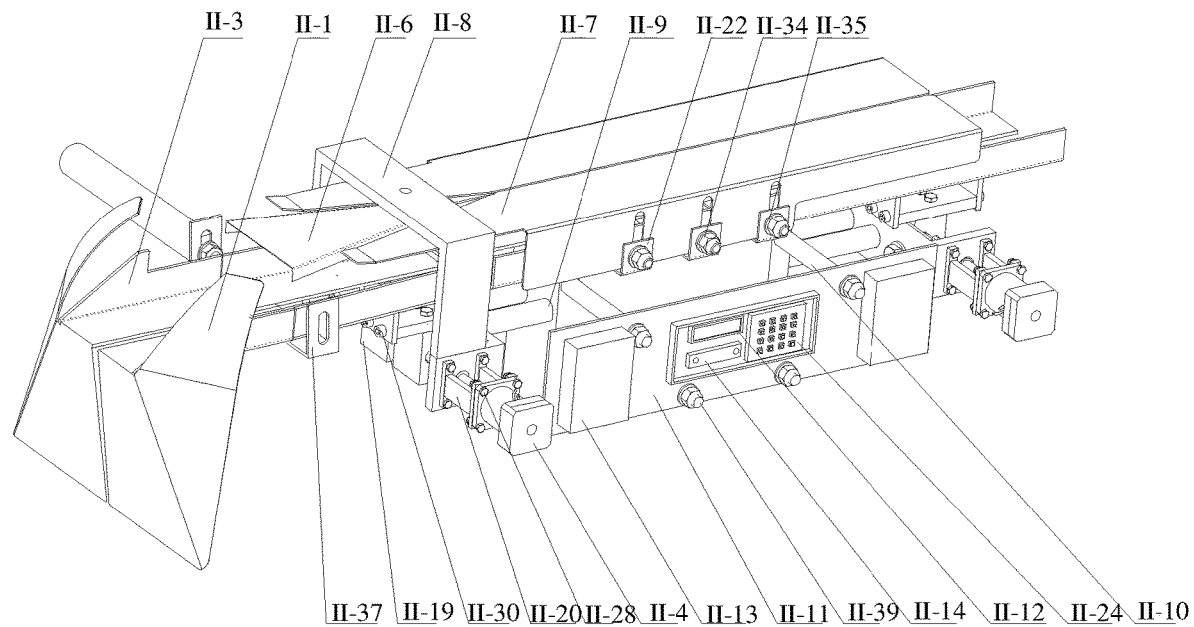
FIG. 2 is an axonometric view of a bag maker according to some embodiments of the present application.

In another typical embodiment of the present application, as shown in FIG. 2, a bag maker is provided, two parts of a shaper II-1 are respectively welded to a bottom plate II-3 of the bag maker, a triangle plate II-6 of the bag maker is fixed to a triangle plate support frame II-8 by a bolt, and the triangle plate support frame is welded to a first guide rail II-2 of a leadscrew and slide block device. Because gaps on two sides of a packaging film are required to be small enough when a packaging bag is thermally sealed, the distance between side plates II-7 needs to be constant. Thus, the side plates are fixed to side plate support frames II-22, and fixed to a bag maker support frame II-23 by side plate support frame screws II-38 and side plate support frame gaskets II-36. The front bottom plate is supported by a bottom plate support frame II-37, and the rear bottom plate is supported by the bag maker support frame II-23. Leadscrew and slide block mechanisms are connected to the bottom of a bottom plate of the bag maker by bottom plate fixing screws II-30 and bottom plate fixing gaskets II-31. Because the distances between front and back bottom plate of the bag makers need to be controlled respectively, so two leadscrew and slide block mechanisms are used.

The two leadscrew and slide block mechanisms are fixed by fixed shafts II-9.

A slide block II-19 slides on a second guide rail II-16, the first guide rail II-2 functions to fix the second guide rail and fix the triangle plate support frame, and the second guide rail functions to guide the slide block to move.

The number of side plates is two, and the two side plates and the bottom plate form a space for accommodating a packaging bag.

Figure 5:
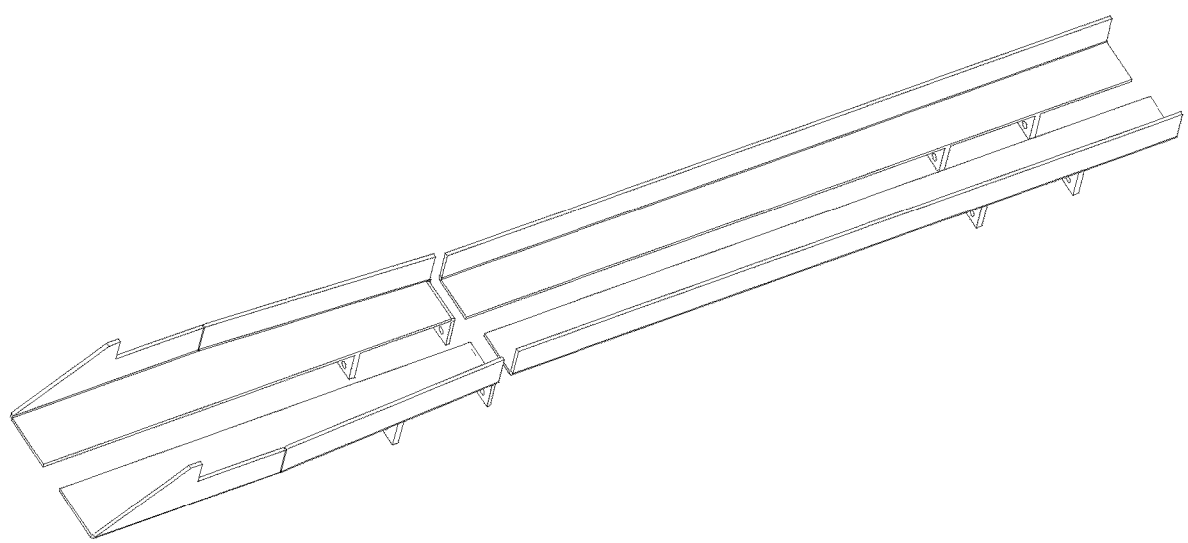
FIG. 5 is an axonometric view of a bottom plate of the bag maker according to some embodiments of the present application.

FIG. 5 shows the bottom plate of the bag maker. The bottom plate of the bag maker is divided into four steel plates, and the front bottom plate and the rear bottom plate are divided into two parts, which can cooperate with the leadscrew and slide block mechanisms to complete the width adjustment of the bottom plate.

Figure 6:
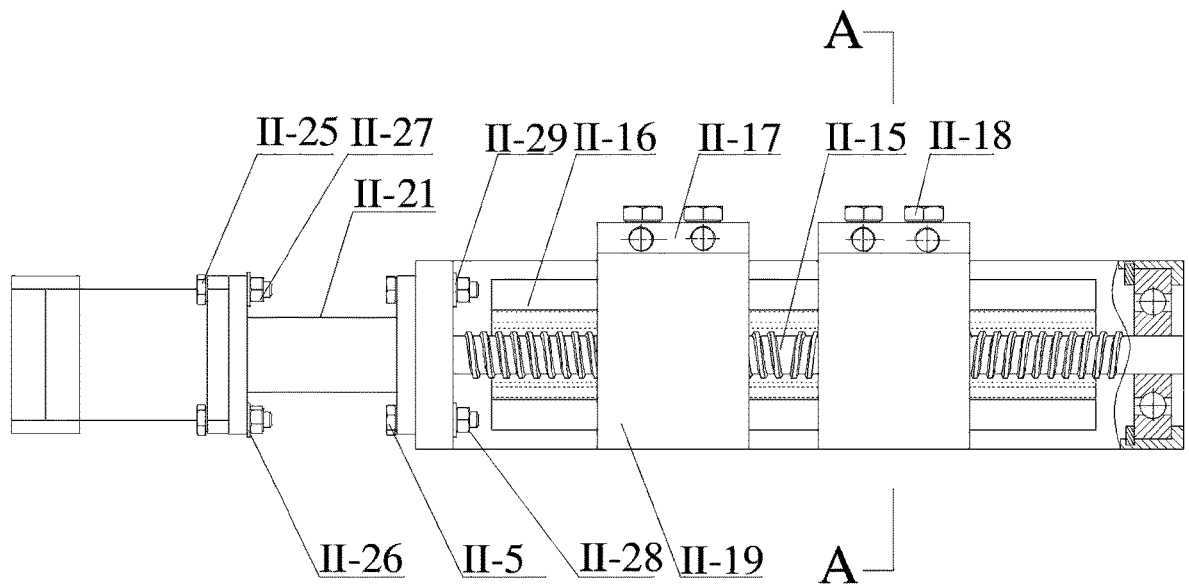
FIG. 6 is a front view and a partial cross-sectional view of a width adjustment device according to some embodiments of the present application.
Figure 7:
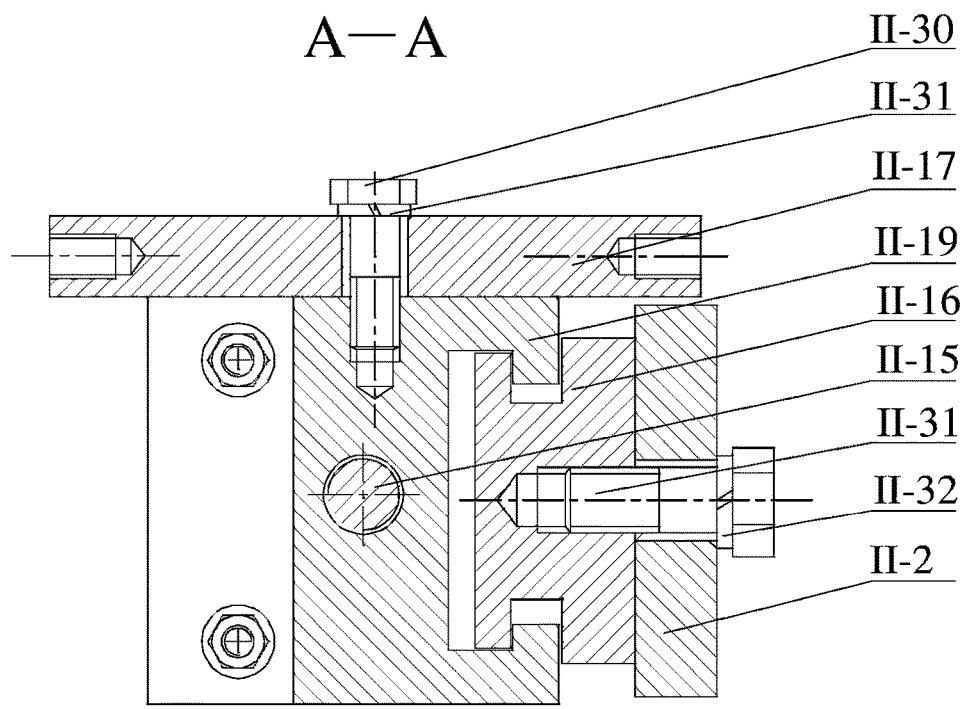
FIG. 7 is a cross-sectional view of a leadscrew and slide block mechanism according to some embodiments of the present application.

FIG. 6 shows a front view and a partial cross-sectional view of the width adjustment device, and FIG. 7 shows a cross-sectional view of a leadscrew and slide block mechanism. A stepper motor II-4 is fixed to a motor fixing block II-20 by stepper motor fixing nuts II-27, stepper motor fixing bolts II-25, and stepper motor fixing gaskets II-26. Then, the motor fixing block is fixed to the first guide rail II-2 by motor fixing plate bolts II-5, motor fixing plate nuts II-28, and motor fixing plate gaskets II-29. A leadscrew II-15 is connected to an output shaft of the stepper motor by a coupling II-21, so that the stepper motor can drive the leadscrew to rotate simultaneously when rotating. The left and right parts of the leadscrew rotate in different directions, so that the slide block moves in the same direction or in the opposite direction when the leadscrew rotates. The leadscrew is supported by a bearing embedded into the first guide rail. The second guide rail II-16 is fixed to the first guide rail by a guide rail fixing screw II-32 and a guide rail fixing gasket. A bottom plate fixing block II-17 is fixed to the top of the slide block by a bottom plate fixing block bolt II-18, a bottom plate fixing screw II-30 and a bottom plate fixing gasket II-31, so as to move with the slide block.

Figure 8:
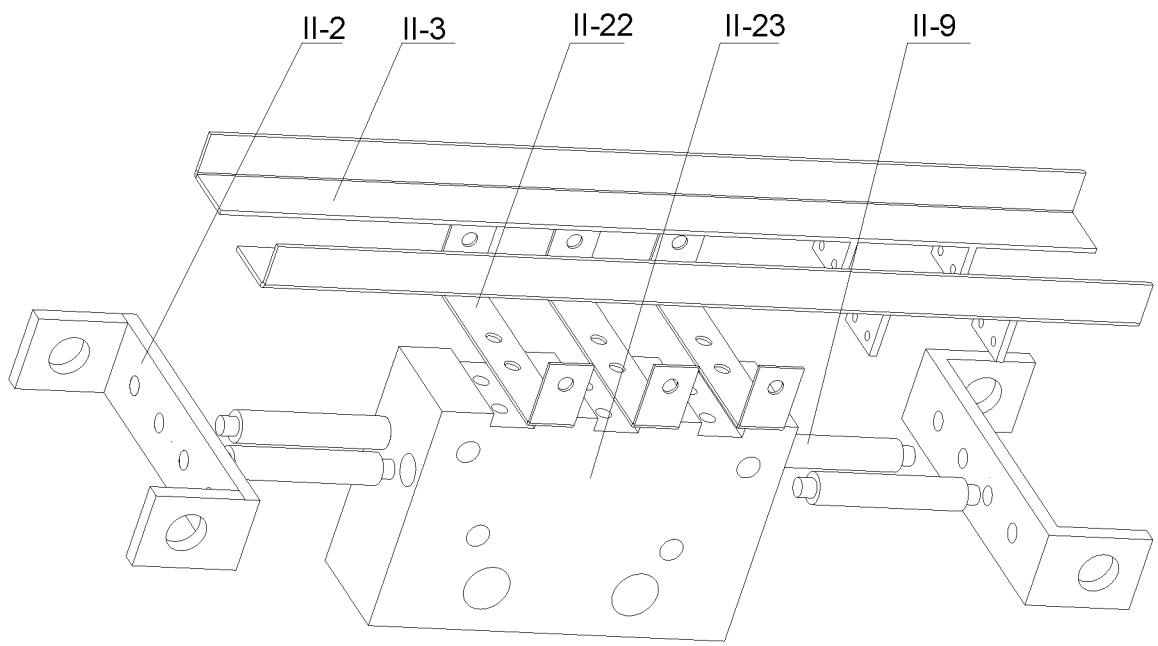
FIG. 8 is an exploded view of a bag maker supporting part according to some embodiments of the present application.
Figure 9:
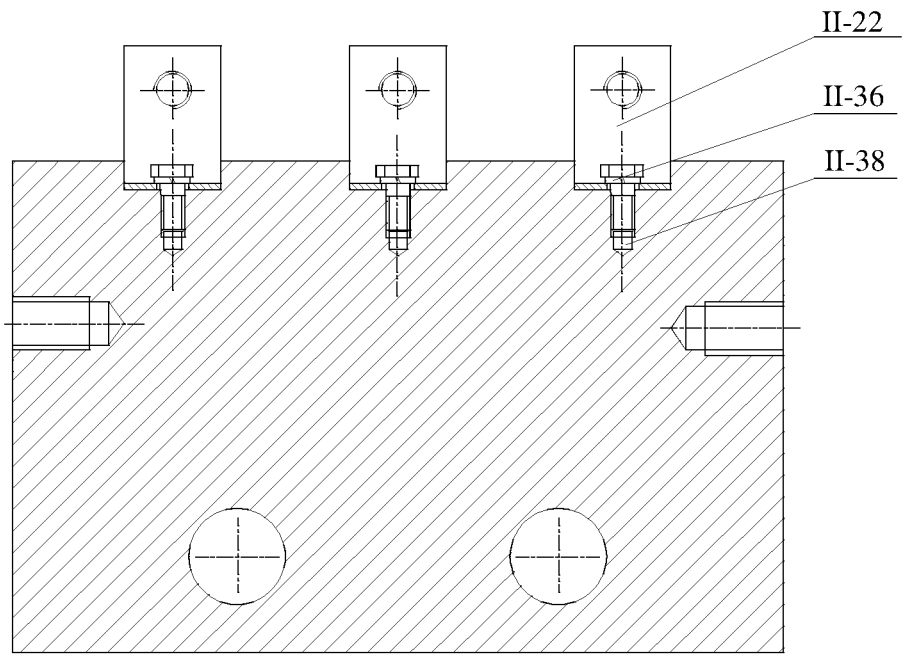
FIG. 9 is a connection diagram of a support block and a side plate support frame according to some embodiments of the present application.

FIG. 8 shows an exploded view of a bag maker supporting part, and FIG. 9 shows a connection diagram of a support block and a side plate support frame. The side plate support frame is fixed to the bag maker support block II-23 by side plate support frame bolts II-33, side plate support frame nuts II-34, side plate support frame gaskets II-35, side plate support frame gaskets II-36, and side plate support frame screws II-38. The bottom plate is in contact with the top of the bag maker support frame, and the bag maker support frame can support the weight of the bottom plate and noodles. The fixed shaft II-9 is fixed to the bag maker support frame by screw connection, and its outside is connected with the first guide rail II-2 to support the width adjustment device.

Figure 4:
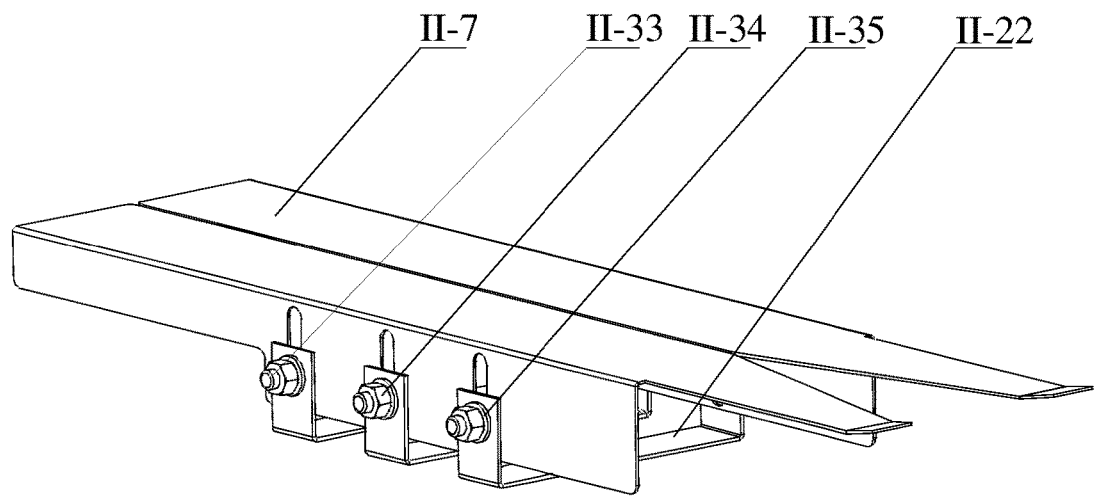
FIG. 4 is a connection diagram of a side plate and a side plate support frame according to some embodiments of the present application.
Figure 10:
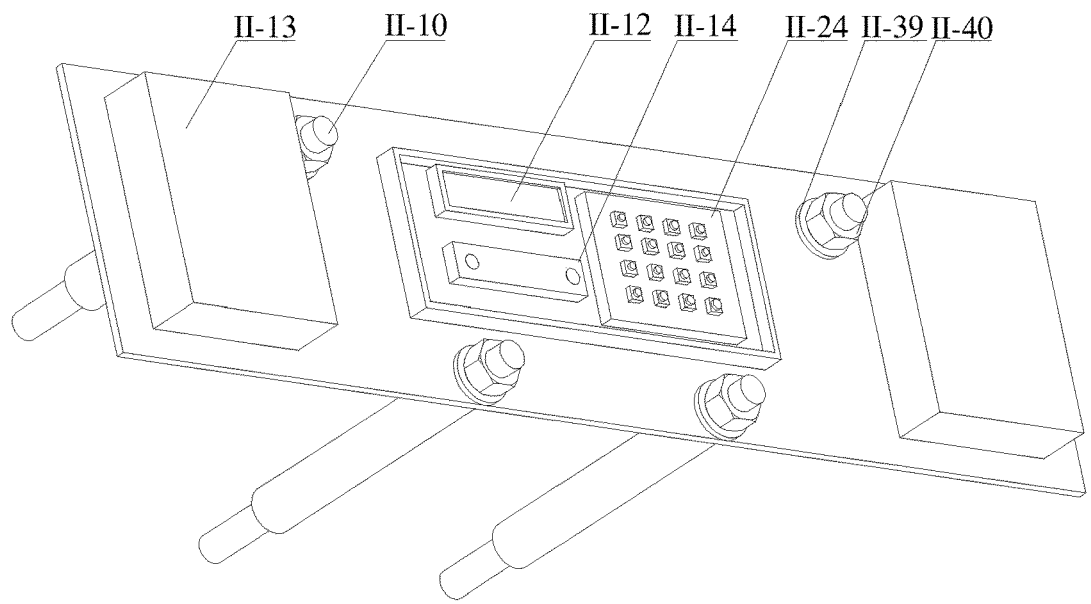
FIG. 10 is an axonometric view of a control panel according to some embodiments of the present application.

In another typical embodiment of the present application, a packaging machine is provided, as shown in FIG. 1, which is mainly composed of three parts: the first part is the packaging bag shaper consisting of the shaper in FIG. 3, the side plates and support frame in FIG. 4, and the bottom plate in FIG. 5; the second part is the width adjustment device shown in FIG. 6; and the third part is a control system shown in FIG. 10.

FIG. 10 shows an axonometric view of a control panel. Control panel support shafts II-10 are connected to the bag maker support frame by rear thread connection, and their front sections fix the control panel II-11 by control panel support shaft nuts II-39 and control panel support shaft gaskets II-40. When the required number of turns is input by a keyboard II-24 or a reset key is pressed, a display screen II-12 displays the corresponding number, a single-chip microcomputer II-14 outputs in the form of pulses, and a power supply II-13 provides power for the stepper motor.

Figure 11:
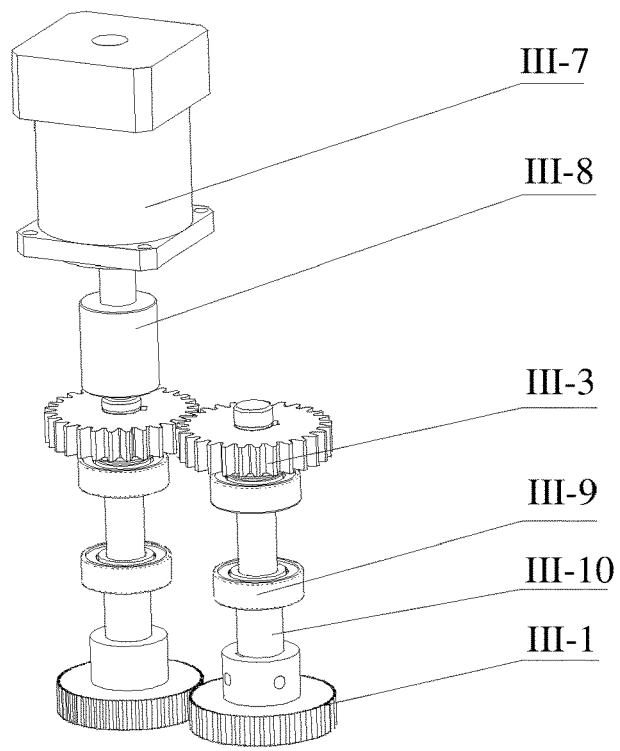
FIG. 11 is an axonometric view of a traction device according to some embodiments of the present application.

FIG. 11 shows an axonometric view of a traction device, wherein the motor is fixed to a traction fixing block III-2 by a fixing plate and a fixing rod III-4, a traction drive gear III-3 is fixed to a traction drive shaft III-10, a traction wheel III-1 is fixed to the traction drive shaft, and the traction drive shaft is fixed to the traction fixing block under the action of a deep groove ball bearing III-9 in the traction fixing block. When the traction device operates, the power of the traction motor III-7 is transmitted to the traction drive shaft by a coupling III-8, the traction drive gear III-3 is driven to rotate, and the right traction drive gear is then driven to rotate. The traction wheel III-1 is driven to rotate by the traction drive shaft, the plastic packaging film moves forward by squeezing and friction of two traction gears, thus completing the traction process of the packaging film. The traction motor is fixed to a traction system fixing seat III-6 by traction system fixing seat nuts III-5.

Figure 12:
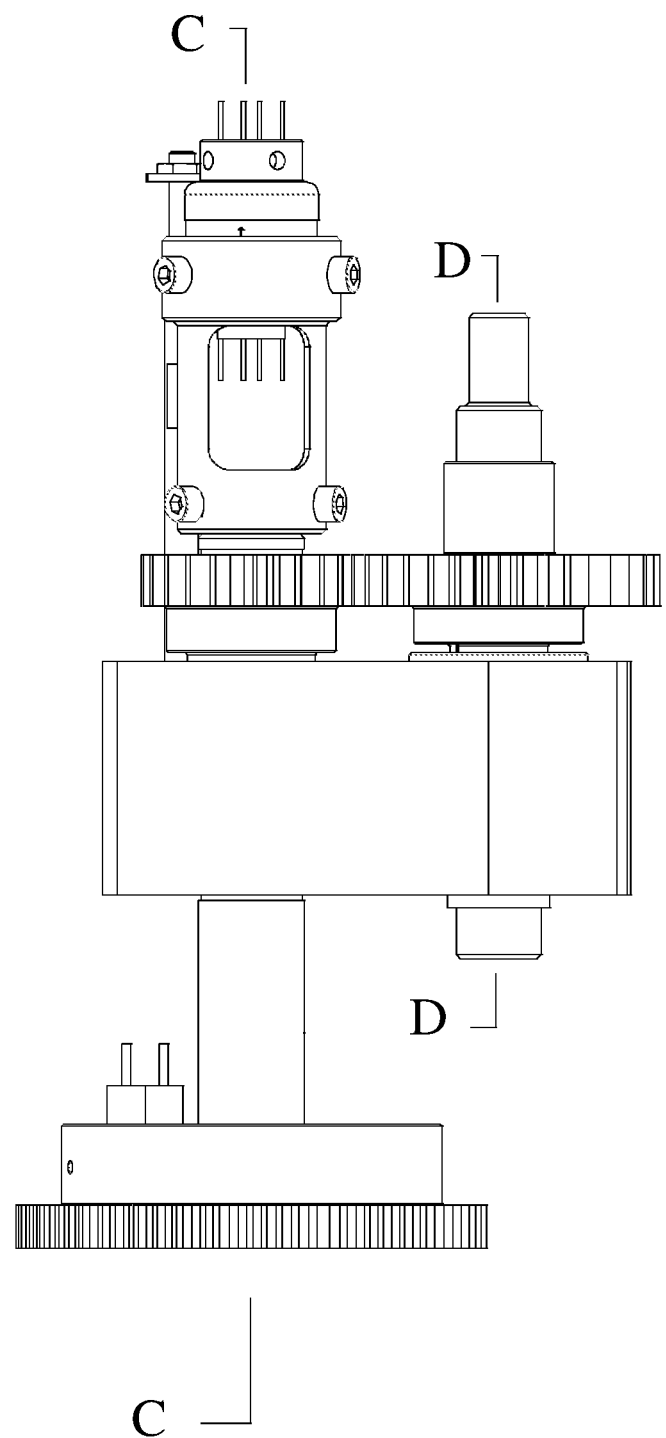
FIG. 12 is a front view of a heat sealing device according to some embodiments of the present application.
Figure 13:
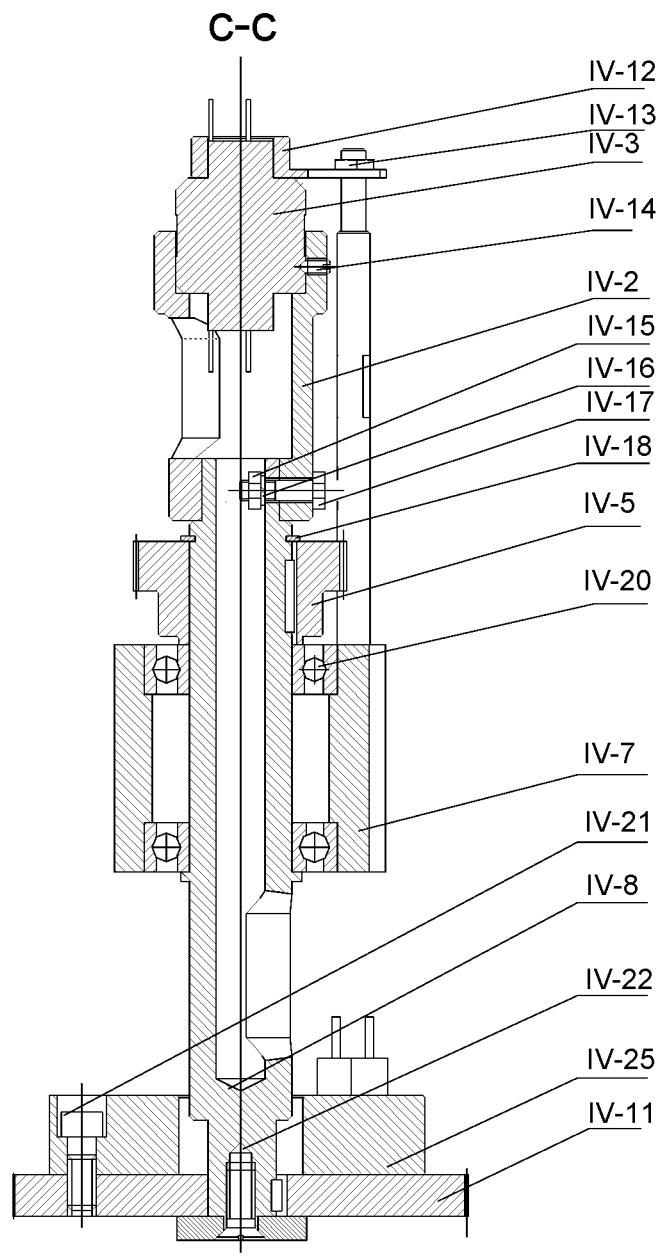
FIG. 13 is a cross-sectional view of the heat sealing device according to some embodiments of the present application.
Figure 14:
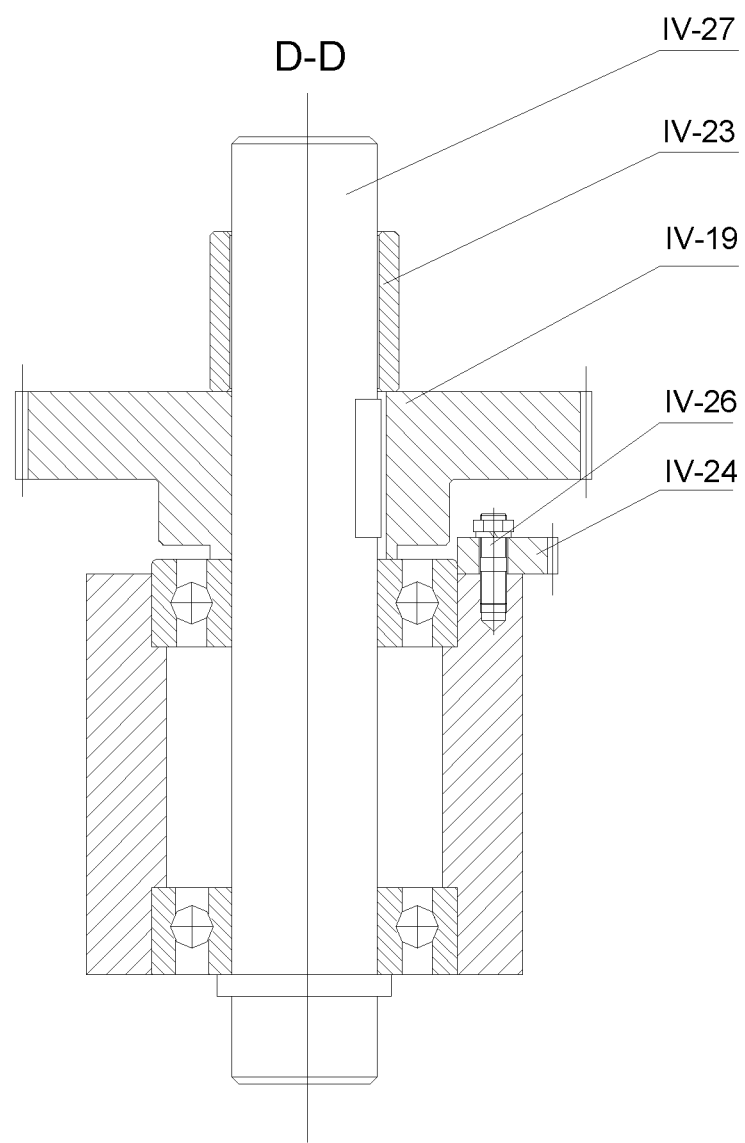
FIG. 14 is a cross-sectional view of a rotating part of the heat sealing device according to some embodiments of the present application.

FIG. 12 is an axonometric view of a heat sealing device, FIG. 13 is a cross-sectional view of the heat sealing device, and FIG. 14 is a cross-sectional view of a rotating part of the heat sealing device. The heat sealing system is divided into a driving part and a driven part, the first part is the driving rotating part, and the second part is the driven rotating part. The member and structure of the first part and the second part are the same, except that the first part is a driving member and the second part is a driven member. Due to the large size of the heat sealing wheel, a heat sealing motor IV-1 first transmits power to a heat sealing shaft IV-8, and the heat sealing shaft drives the heat sealing wheel IV-11 to rotate. Meanwhile, a heat sealing drive gear IV-19 and a heat sealing drive shaft IV-27 drive the second part to rotate. After the same power transmission, the heat sealing wheel of the first part and the heat sealing wheel of the second part can rotate at the same time to drive the packaging film to move and thermally seal the packaging film.

FIG. 13 shows a cross-sectional view of the heat sealing device, a mercury slip ring IV-3 and a mercury slip ring fixing plate IV-12 are at the top of the shaft, the mercury slip ring is circumferentially positioned by a set screw IV-14, and the mercury slip ring fixing plate is fixed by a fixing rod nut IV-13. The mercury slip ring is a conductive rotating head with mercury as a fluid medium, its fixed end and rotating end are integrated together, and the mercury is used to conduct electricity. In the heat sealing device, the mercury slip ring is fixed to a heat insulation sleeve IV-2 by a bolt, the heat insulation sleeve is fixed to the heat sealing shaft by a heat insulation sleeve fixing nut IV-15, a heat insulation sleeve fixing gasket IV-16 and a heat insulation sleeve fixing bolt IV-17, the upper part of the heat insulation sleeve is connected to a power line, the lower part of the heat insulation sleeve is connected to a heating plate IV-25 below via a through hole in the heat sealing shaft IV-8, and the heating plate is connected to the heat sealing wheel. The heating plate transmits heat to the heat sealing wheel, and then the packaging film is heated and sealed. A heat sealing drive gear IV-5 and a heat sealing drive gear IV-19 are used as power parts. The heat sealing drive gear IV-5 is axially positioned by a circlip IV-18 and an inner ring of a bearing IV-20. The heating plate and the heat sealing wheel are fixed by a heat sealing wheel inside hexagonal bolt IV-21, and the heat sealing wheel IV-11 is axially positioned by a shaft end screw V-22. During heat sealing, the relative positions of the two heat sealing wheels need to be adjusted at any time to achieve optimal positions for heat sealing. This device is added with an angle adjustment gear IV-24. The angle adjustment gear is fixed to a heat sealing fixing block IV-6 by an angle adjustment gear screw, and therefore does not rotate with the rotation of the drive shaft. When the positions of the two parts need to be adjusted, the positions of the fixing seats are manually rotated. The whole heat sealing device is fixed to the heat sealing fixing block IV-6 by the deep groove ball bearing. The heat sealing rotating part is fixed to a heat sealing seat IV-7 by a bearing IV-4, the bearing and the heat sealing drive gear IV-19 are axially positioned by a shaft sleeve IV-23, and the entire heat sealing system is fixed to the whole machine by a heat sealing fixing plate IV-9 and a heat sealing fixing shaft IV-10.

The operating process of this device is as follows:

A bag film supply wheel I-1 rotates, and a packaging film passes through a packaging film guide roller I-3. The packaging film guide roller I-3 is mounted on a guide roller fixing seat I-4 by a bearing I-2. The packaging film I-5 is preliminarily transferred to the bag maker. The traction device III drives the plastic packaging film to move. When the packaging film passes through the shaper II-1, the packaging film begins to fold reversely inward by a certain angle. When passing through the bag maker triangle plate I-3, two sides of the packaging film begin to move closer to the middle to form an approximately square packaging film, thus completing preliminary shaping. Driven by the traction device III and the heat sealing device IV, the packaging film arrives at the heat sealing wheel, and under the action of the heat sealing device, the two sides of the packaging film are heated and sealed, thus completing heat sealing of the packaging film. The change in the weight of noodles needs to change the width of a plastic packaging bag. Thus, the width of the shaper II-1 and the widths of the front bottom plate and the rear bottom plate of the bag maker need to be changed. When the widths of the shaper and the front bottom plate of the bag maker need to be adjusted, the width adjustment device begins to operate. The width adjustment device consists of a stepper motor II-4, a motor fixing block II-20, a coupling II-21, a guide rail 1 II-2, a guide rail 2 II-16, a leadscrew II-15, a slide block II-19, and a leadscrew bearing. When the width adjustment device operates, the stepper motor first rotates, the coupling II-21 connects the output shaft of the stepper motor to one end of the leadscrew, and the rotation of the motor drives the rotation of the leadscrew. The distance of movement of the slide block can be obtained by determining the number of rotation turns of the motor. The left and right parts of the leadscrew rotate in different directions. When the leadscrew rotates clockwise or counterclockwise, the slide block II-19 is driven to move in the same direction or in the opposite direction. The slide block is connected to the bottom plate of the bag maker by a bottom plate fixing block II-17, a bottom plate fixing block screw II-30, and a bottom plate fixing block gasket II-31, so the shaper and the front bottom plate of the bag maker will also move in the same direction or in the opposite direction. The number of rotation turns of the stepper motor is determined by the control system. The power supply II-13 provides power for the rotation of the motor. By programming, when a forward rotation keyboard is pressed down by the keyboard II-24, the motor rotates forward, otherwise, it rotates reversely. When a number key is pressed down, the motor rotates the corresponding number of turns. The leadscrew has a diameter of 10 mm, and a pitch of 1.25 mm after looking up a table. The distance of movement of the slide block can be obtained by determining the number of turns of the motor. When the reset key is pressed down, the slide block returns to the original position. The display screen II-12 dynamically displays data and various parameters, and whether the width adjustment is accurate can be monitored more simply and intuitively.

It should be noted here that the shaper is welded together with the front bottom plate, having a left width and a right width of the front bottom plate, so the widths of the shaper and the front bottom plate are adjusted by the front leadscrew and slide block mechanism. The number of rotation turns of the motor is that of the leadscrew. Because the leadscrew is of a single-head thread, the axial distance of movement for each turn of rotation of the leadscrew is the pitch, namely 1.25 mm, therefore, one turn of the motor causes the slide to move 1.25 mm axially.

In the above embodiment of the present disclosure, high accuracy of adjustment is required, and the adjustment accuracy of the leadscrew meets the requirements, so the leadscrew is selected as a position control member. The slide block is fixed to the guide rail, the center hole of the slide block cooperates with the leadscrew, the left half of the leadscrew is rotated to the left, and the right half is rotated to the right, so that when the leadscrew is rotated, the two slide blocks move in opposite directions or in the same direction. The bottom plate is fixed to the slide block, and when the slide block moves, the bottom plate is simultaneously driven to move inward or outward, thereby adjusting the width of the bag maker. The leadscrew and slide block mechanism is used to adjust the width of the bag maker to meet the requirement for accuracy; the mechanism takes up less space, which meets the requirement of the bag maker for size; and the mechanism has a few parts and is of a pure mechanical structure, so the cost is low.

The single-chip integrated circuit chip integrates the functions of a central processing unit (CPU) having data processing capability, a random access memory (RAM), a read-only memory (ROM), a plurality of I/O interfaces and interrupt systems, a timer and the like into a small and perfect microcomputer system constituted on a silicon chip by using ultra-large-scale integrated circuit technology. Single-chip microcomputers penetrate into all areas of our lives. It is almost difficult to find which field does not have the trace of single-chip microcomputers. Network communication and data transmission of computers, real-time control and data processing of industrial automation, control of video cassette recorders, cameras and full-automatic washing machine, program-controlled toys, electronic pets, etc. are inseparable from single-chip microcomputers. The single-chip microcomputer has the advantages of small size, strong control function, low power consumption, strong environmental adaptability, flexible expansion, convenient use and the like, and the single-chip microcomputer can form a variety of control systems. To improve the automation level of the bag maker, the single-chip microcomputer is used as a control element of the width adjustment device of the bag maker, which improves the automation level of the bag maker and reduces the cost of the control system to the greatest extent.

The stepper motor is an open-loop control element that converts an electrical pulse signal into an angular displacement or a linear displacement. In the case of non-overload, the speed and stop position of the motor only depend on the frequency of pulse signals and the number of pulses, without being affected by load change. When a stepper driver receives a pulse signal, it drives the stepper motor to rotate a constant angle according to the set direction, called "step angle", and the stepper motor rotates step by step at the constant angle. The angular displacement can be controlled by controlling the number of pulses, so as to achieve the purpose of accurate positioning. Meanwhile, the speed and acceleration of the motor can be controlled by controlling the frequency of pulses, so as to achieve the purpose of speed regulation. The stepper motor is connected to one end of the leadscrew by a coupling. When the stepper motor rotates, the leadscrew is driven to rotate, and the width adjustment device begins to operate.

The specific usages of the single-chip microcomputer and the stepper motor are as follows: the low-cost single-chip microcomputer is used as a control system for width adjustment and used to control the rotation of the stepper motor, the shaft end of the stepper motor is connected to the shaft end of the leadscrew by a coupling, and the shaft end of the leadscrew is driven to rotate when the stepper motor rotates. The speed and stop position of the stepper motor only depend on the frequency of pulse signals and the number of pulses, without being affected by load change, so when the stepper driver receives a pulse signal, it drives the stepper motor to rotate a constant angle according to the set direction. Based on this characteristic of the stepper motor, a single-chip microcomputer is used to control the stepper motor. Then, the motor can continuously rotate by providing certain time of pulse current to four wires in sequence. The speed can be controlled by changing the time interval of pulse current, and the steering can be controlled by changing the sequence of pulse current of the four wires. In the present invention, only the number of rotation turns and forward and reverse rotation of the stepper motor need to be controlled. A keyboard device is used at the input terminal. By programming, when the forward rotation keyboard is pressed down, the motor rotates forward, otherwise, it rotates reversely. When the number key is pressed down, the motor rotates the corresponding number of turns. The leadscrew has a diameter of 10 mm, and a pitch of 1.25 mm after looking up a table. The distance of movement of the slide block can be obtained by determining the number of turns of the motor. When the reset key is pressed down, the slide block returns to the original position. An LED digital tube is used to dynamically display data and various parameters, and whether the width adjustment is accurate can be monitored more simply and intuitively. In addition, the method is simple, easy to control, and low-cost.

Described above are merely preferred embodiments of the present application, and the present application is not limited thereto. Various modifications and variations may be made to the present application for those skilled in the art. Any modifications, equivalent substitutions, improvements and the like made within the spirit and principle of the present application shall fall within the scope of the present application.

The invention claimed is:

1. A bag maker, comprising:
a width-adjustable packaging bag shaper, comprising two parts arranged symmetrically, the a width between the two parts being adjustable, a middle part serving as a guide surface, two sides of the shaper being side wings bent toward the middle part, and parts where portions of the side wings extend beyond the guide surface being bent toward a back of the guide surface to form back tilting angles; and the shaper being configured such that when a packaging film passes, the packaging film begins to fold reversely inward by a certain angle; and
a bag maker triangle plate, the bag maker triangle plate being located obliquely above the shaper, and being configured such that when the packaging film folded reversely inward by a certain angle passes through the bag maker triangle plate, two sides of the packaging film begin to move closer to a middle to form an approximately square packaging film, wherein:
one end of the guide surface of the shaper is connected to a bottom plate comprising a front bottom plate and a rear bottom plate, and the front bottom plate and the rear bottom plate are respectively composed of two sub bottom plates that each have a same structure; and
the front bottom plate and the rear bottom plate are respectively connected to a width adjustment device, and the width adjustment device adjusts distances between different sub bottom plates in the front bottom plate and the rear bottom plate by using a leadscrew and slide block mechanism, and thereby adjusts a width of the bottom plate.

2. The bag maker according to claim 1, wherein the width adjustment device comprises, for each of the front bottom plate and the rear bottom plate, (i) a stepper motor, (ii) a leadscrew is-connected to an output shaft of the stepper motor by a coupling, (iii) a pair of slide blocks threadedly engaged with the leadscrew, and (iv) bottom plate fixing blocks fixed respectively to tops of the slide blocks and is-movable with the slide blocks, wherein the bottom plate fixing blocks are respectively connected to the sub bottom plates, a left part and a right part of the leadscrew are threaded in different directions, and the slide blocks are respectively engaged with the left part and the right part, and move toward or away from each other when the leadscrew is rotated by the stepper motor.

3. The bag maker according to claim 2, wherein
the stepper motor is fixed to a first guide rail by a motor fixing block, the leadscrew is supported by a bearing embedded into the first guide rail, and a second guide rail is fixed to the first guide rail;
the bag maker further comprises side plates, the side plates are arranged above the bottom plate, widths of the side plates are greater than a maximum width adjustable by the bottom plate, the side plates are fixed to a bag maker support frame by side plate support frames, and two ends of the bag maker support frame are respectively connected to the first guide rail and the second guide rail by fixed shafts;
the bottom plate is supported by a bottom plate support frame, and the side plate support frames are fixed to the bag maker support frame;
the bag maker triangle plate is fixed to a triangle plate support frame, and the triangle plate support frame is fixed to the first guide rail.

4. A packaging machine, comprising:
the bag maker according to claim 1;
a traction device and a heat sealing device that are respectively arranged above the bag maker; and
a control system; wherein:
the traction device comprises a traction motor, the traction motor is connected to a first traction gear by a coupling, the first traction gear meshes with a second traction gear, and the first traction gear and the second traction gear are respectively connected to traction wheels by respective traction drive shafts;
power of the traction motor is transmitted to a traction drive shaft by the coupling, the first traction drive gear is driven to rotate, the second traction drive gear is driven to rotate, and the two traction wheels are driven to rotate by the respective traction drive shafts, the two traction wheels being configured to squeeze the packaging film and move the packaging film forward by friction;
the heat sealing device implements heat sealing of the packaging film; and
the control system is configured to control the heat sealing device and the traction motor.

5. The packaging machine according to claim 4, wherein the heat sealing device comprises a driving rotating part and a driven rotating part;

the driving rotating part comprises a heat sealing motor, the heat sealing motor transmits power to a heat sealing shaft, the heat sealing shaft transmits power to a first heat sealing drive gear, the first heat sealing drive gear transmits power to a second heat sealing drive gear, a-the second heat sealing drive gear transmits power to a heat sealing drive shaft, the heat sealing shaft drives a first heat sealing wheel to rotate, the second heat sealing drive gear also drives the driven rotating part to rotate, and the first heat sealing wheel of the driving rotating part and a second heat sealing wheel of the driven rotating part rotate simultaneously by the same power transmission, to drive the packaging film to move and thermally seal the packaging film at the same time.

6. The packaging machine according to claim 5, wherein the heat sealing device further comprises an angle adjustment gear, the angle adjustment gear is fixed to a heat sealing fixing seat, and the angle adjustment gear is configured to adjust relative positions of the first and second heat sealing wheels to achieve optimal positions of heat sealing.

7. A packaging machine, comprising:
the bag maker according to claim 3;
a traction device and a heat sealing device that are respectively arranged above the bag maker; and
a control system; wherein:
the traction device comprises a traction motor, the traction motor is connected to a first traction gear by a coupling, the first traction gear meshes with a second traction gear, and the first traction gear and the second traction gear are respectively connected to traction wheels by respective traction drive shafts;
power of the traction motor is transmitted to a traction drive shaft by the coupling, the first traction drive gear is driven to rotate, the second traction drive gear is driven to rotate, and the two traction wheels are driven to rotate by the respective traction drive shafts, the two traction wheels being configured to squeeze the packaging film and move the packaging film forward by friction;
the heat sealing device implements heat sealing of the packaging film; and
the control system is configured to control the heat sealing device, the traction motor and the stepper motor.

8. The packaging machine according to claim 7, wherein the heat sealing device comprises a driving rotating part and a driven rotating part;

the driving rotating part comprises a heat sealing motor, the heat sealing motor transmits power to a heat sealing shaft, the heat sealing shaft transmits power to a first heat sealing drive gear, the first heat sealing drive gear transmits power to a second heat sealing drive gear, a-the second heat sealing drive gear transmits power to a heat sealing drive shaft, the heat sealing shaft drives a first heat sealing wheel to rotate, the second heat sealing drive gear also drives the driven rotating part to rotate, and the first heat sealing wheel of the driving rotating part and a second heat sealing wheel of the driven rotating part rotate simultaneously by the same power transmission, to drive the packaging film to move and thermally seal the packaging film at the same time.

9. The packaging machine according to claim 8, wherein the heat sealing device further comprises an angle adjustment gear, the angle adjustment gear is fixed to a heat sealing fixing seat, and the angle adjustment gear is configured to adjust relative positions of the two heat sealing wheels to achieve optimal positions of heat sealing.

10. A packaging machine, comprising:
the bag maker according to claim 2;
a traction device and a heat sealing device that are respectively arranged above the bag maker; and
a control system; wherein:
the traction device comprises a traction motor, the traction motor is connected to a first traction gear by a coupling, the first traction gear meshes with a second traction gear, and the first traction gear and the second traction gear are respectively connected to traction wheels by respective traction drive shafts;
power of the traction motor is transmitted to a traction drive shaft by the coupling, the first traction drive gear is driven to rotate, the second traction drive gear is driven to rotate, and the two traction wheels are driven to rotate by the respective traction drive shafts, the two traction wheels being configured to squeeze the packaging film and move the packaging film forward by friction;
the heat sealing device implements heat sealing of the packaging film; and
the control system is configured to control the heat sealing device, the traction motor and the stepper motor.

11. The packaging machine according to claim 10, wherein the heat sealing device comprises a driving rotating part and a driven rotating part;

the driving rotating part comprises a heat sealing motor, the heat sealing motor transmits power to a heat sealing shaft, the heat sealing shaft transmits power to a first heat sealing drive gear, the first heat sealing drive gear transmits power to a second heat sealing drive gear, the second heat sealing drive gear transmits power to a heat sealing drive shaft, the heat sealing shaft drives a first heat sealing wheel to rotate, the second heat sealing drive gear also drives the driven rotating part to rotate, and the first heat sealing wheel of the driving rotating part and a second heat sealing wheel of the driven rotating part rotate simultaneously by the same power transmission, to drive the packaging film to move and thermally seal the packaging film at the same time.

12. The packaging machine according to claim 11, wherein the heat sealing device further comprises an angle adjustment gear, the angle adjustment gear is fixed to a heat sealing fixing seat, and the angle adjustment gear is configured to adjust relative positions of the two heat sealing wheels to achieve optimal positions of heat sealing.

13. A control method for a packaging machine, comprising:
controlling a traction device to drive a packaging film to move, such that when the packaging film passes through a shaper, the packaging film begins to fold reversely inward by a certain angle; and when the packaging film passes through a bag maker triangle plate, two sides of the packaging film begin to move closer to the middle to form an approximately square packaging film, thus completing preliminary shaping;
controlling the traction device and a heat sealing device to further drive the packaging film to a heat sealing wheel, wherein two sides of the packaging film are heated and sealed by the heat sealing device, thus completing heat sealing of the packaging film; and
controlling a width adjustment device to adjust a width of the a front plate of the shaper and a bag maker, in order to change a width of a plastic packaging bag formed by the packaging film; the controlling the width adjustment device including causing a stepper motor to rotate, wherein a coupling connects an output shaft of the stepper motor to one end of a leadscrew, the rotation of the stepper motor rotates the leadscrew, a pair of slide blocks are threadedly engaged with the leadscrew, and a distance of movement of the slide blocks correlates to a number of turns of the stepper motor; wherein:

left and right parts of the leadscrew are threaded in different directions, and are respectively engaged with the slide blocks, such that when the leadscrew rotates clockwise or counterclockwise, the slide block isblocks are driven to move toward each other or away from each other;

the slide blocks are respectively connected to sub bottom plates of the bag maker by bottom plate fixing blocks, whereby the sub bottom plates of the bag maker will move toward or away from each other;

two traction wheels of the traction device squeeze the packaging film and move the packaging film forward by friction; and the heat sealing device drives the packaging film to move and thermally seals the packaging film at the same time.

\* \* \* \* \*